United States Patent
Attar et al.

(10) Patent No.: US 9,342,317 B2
(45) Date of Patent: May 17, 2016

(54) IMPORTING PROFILES FOR CONFIGURING SPECIFIC SYSTEM COMPONENTS INTO A CONFIGURATION PROFILE FOR THE SYSTEM

(75) Inventors: Mohammed M. Attar, Placentia, CA (US); Huzefa A. Hakim, Laguna Hills, CA (US); Paul S. MacAlpine, Laguna Hills, CA (US); Lauren A. Mayes, Laguna Beach, CA (US); Raghuram Tadipatri, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 198 days.

(21) Appl. No.: 13/570,890

(22) Filed: Aug. 9, 2012

(65) Prior Publication Data

US 2014/0047414 A1     Feb. 13, 2014

(51) Int. Cl.
*G06F 9/44*     (2006.01)
*G06F 9/445*    (2006.01)

(52) U.S. Cl.
CPC ............... *G06F 9/4411* (2013.01); *G06F 9/44* (2013.01); *G06F 9/445* (2013.01)

(58) Field of Classification Search
CPC .............. G06F 8/20; G06F 8/36; G06F 8/71; G06F 9/44505
See application file for complete search history.

(56) References Cited

U.S. PATENT DOCUMENTS

| | | | |
|---|---|---|---|
| 5,950,001 A | 9/1999 | Hamilton et al. | |
| 6,301,707 B1 | 10/2001 | Carroll et al. | |
| 6,785,689 B1 * | 8/2004 | Daniel | G06F 17/30292 707/754 |
| 7,526,457 B2 | 4/2009 | Duevel et al. | |
| 7,735,080 B2 * | 6/2010 | Barturen | G06F 8/81 709/221 |
| 7,831,959 B1 * | 11/2010 | Perry | G06F 9/44505 717/121 |
| 8,127,268 B2 | 2/2012 | Fernandez-Ivern et al. | |
| 8,141,041 B2 * | 3/2012 | Williamson | G06F 9/44505 717/108 |
| 8,266,617 B2 * | 9/2012 | Pichetti | G06F 8/68 717/121 |
| 8,291,405 B2 * | 10/2012 | Buckley | G06F 8/63 706/52 |
| 8,302,077 B2 | 10/2012 | Manczak et al. | |
| 8,359,390 B2 | 1/2013 | Cupit | |
| 8,407,662 B2 * | 3/2013 | Lam | G06F 8/63 709/220 |
| 2003/0078908 A1 * | 4/2003 | Paransky | G06Q 30/02 |
| 2004/0181779 A1 * | 9/2004 | Gorti | G06F 8/61 717/120 |

(Continued)

OTHER PUBLICATIONS

IBM, "Method to Create Clone-able Software Installations", IP.com, IPCOM000159119D, Oct. 8, 2007, 7 pages.

*Primary Examiner* — Li B Zhen
*Assistant Examiner* — Mohammad Kabir
(74) *Attorney, Agent, or Firm* — Jeanine Ray; Edell, Shapiro & Finnan, LLC

(57) ABSTRACT

According to a present invention embodiment, a system imports information from a source profile into a target profile. The system maps one or more entities within the source profile to one or more entities of the target profile pertaining to configuring a system including a plurality of system components. Properties of the one or more entities within the source profile are compared to properties of corresponding mapped entities in the target profile. The values of the properties of the one or more entities within the target profile are set to the property values of the corresponding one or more mapped entities within the source profile in response to the comparison indicating the properties correspond. Embodiments of the present invention further include a method and computer program product for importing information from a source profile into a target profile in substantially the same manner described above.

21 Claims, 14 Drawing Sheets

(56) References Cited

U.S. PATENT DOCUMENTS

| | | | |
|---|---|---|---|
| 2005/0273717 A1* | 12/2005 | Breeden | G06F 17/30867 715/736 |
| 2006/0075102 A1 | 4/2006 | Cupit | |
| 2006/0161895 A1* | 7/2006 | Speeter | G06F 8/71 717/121 |
| 2006/0165123 A1 | 7/2006 | Jerrard-Dunne et al. | |
| 2007/0078873 A1* | 4/2007 | Avinash | G06F 17/3028 |
| 2008/0127093 A1 | 5/2008 | Fernandez-Ivern | |
| 2009/0150882 A1* | 6/2009 | Dechovich | G06F 8/61 717/178 |
| 2009/0222429 A1* | 9/2009 | Aizenbud-Reshef | G06F 8/36 |
| 2010/0005451 A1 | 1/2010 | Hirose et al. | |
| 2010/0071066 A1 | 3/2010 | Kline et al. | |
| 2010/0114816 A1* | 5/2010 | Kiilerich | 707/610 |
| 2010/0192006 A1 | 7/2010 | Gharat et al. | |
| 2010/0235813 A1 | 9/2010 | Manczak et al. | |
| 2011/0078673 A1* | 3/2011 | Muckenhuber | G06F 9/44505 717/168 |
| 2012/0204149 A1* | 8/2012 | Joukov | G06F 11/3051 717/121 |
| 2013/0174129 A1* | 7/2013 | Grammel | G06F 8/35 717/136 |
| 2013/0198349 A1 | 8/2013 | Wright et al. | |
| 2013/0332899 A1* | 12/2013 | Stewart | G06F 9/44505 717/121 |
| 2014/0047228 A1 | 2/2014 | Attar et al. | |

\* cited by examiner

IMPORTING PROFILES FOR CONFIGURING SPECIFIC SYSTEM COMPONENTS INTO A CONFIGURATION PROFILE FOR THE SYSTEM

BACKGROUND

1. Technical Field

Present invention embodiments relate to system configuration, and more specifically, to importing individual profiles for configuring specific system components into a configuration profile for configuring the system.

2. Discussion of the Related Art

In order to configure a heterogeneous software system containing different software components, each software component must typically be configured independently. This is accomplished either through performance of a series of manual steps, or with use of a tool. Tools for configuration of software components generally focus on a specific component within a potentially heterogeneous software system, and utilize a wizard format (e.g., a series of graphical user interface (GUI) screens) to perform the product configuration. Thus, extraneous tools are used to configure a software system since each component of the software system is associated with a corresponding tool.

In the absence of a tool, manual steps must be followed that can be tedious and error prone when repeated for configuring multiple instances of a software system. The usefulness of the tools become negatively impacted when the tools do not allow users to perform the required steps for the configuration. Even when a tool does allow for configuration of different heterogeneous software components, the configuration steps are separated into different parts of the tool, thereby requiring the user to typically configure one software component at a time. When software components are codependent and interleave configuration steps, this interleaving is significantly complex. In this case, the user manually switches between different parts of the tool for the configuration.

Profiles have been introduced that decompose configuration steps into tasks that are independently performed. However, each profile focuses on a specific component of the overall software system, where interleaving of tasks is difficult. Further, in order to upgrade to a newer version of a software system, each profile for a component is converted using a type of upgrade profile to upgrade each component to the new version required by the software system.

BRIEF SUMMARY

According to one embodiment of the present invention, a system includes at least one processor for importing information from a source profile for configuring one or more system components into a target profile for configuring a system including a plurality of system components. The system maps one or more entities within the source profile to one or more entities of the target profile pertaining to configuring a system including a plurality of system components. Properties of the one or more entities within the source profile are compared to properties of corresponding mapped entities in the target profile. The values of the properties of the one or more entities in the target profile are set to the property values of the corresponding one or more mapped entities of the source profile in response to the comparison indicating the properties correspond. Embodiments of the present invention further include a method and computer program product for importing information from a source profile into a target profile in substantially the same manner described above.

BRIEF DESCRIPTION OF THE SEVERAL VIEWS OF THE DRAWINGS

Generally, like reference numerals in the various figures are utilized to designate like components.

DETAILED DESCRIPTION

Figure 1:
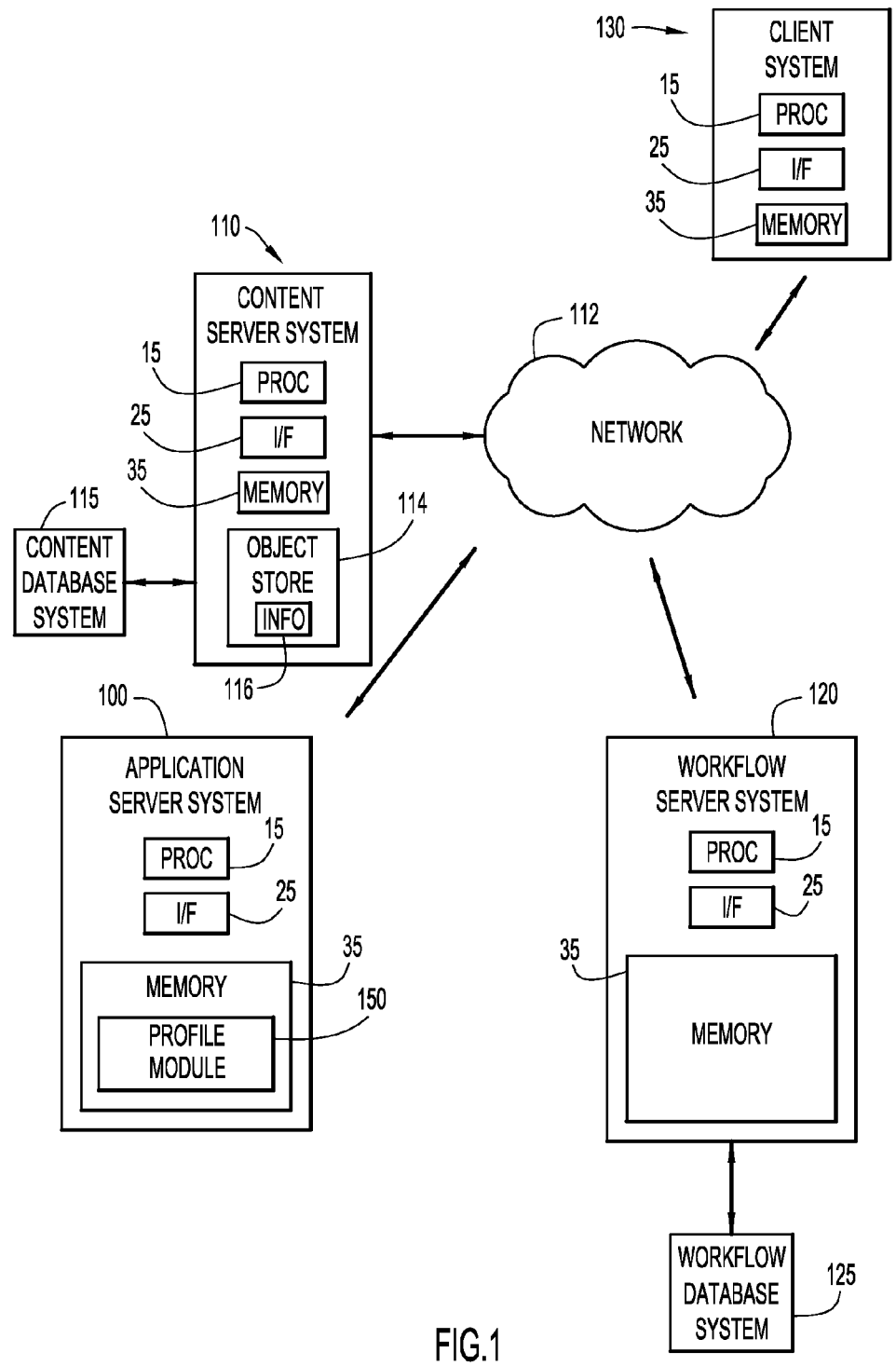
FIG. 1 is a diagrammatic illustration of an example computing environment for use with an embodiment of the present invention.

Present invention embodiments pertain to importing profiles configuring specific components of a system into a configuration profile for the system. This may be accomplished by a configuration tool of present invention embodiments. A configuration profile includes a collection of tasks, and properties of the tasks and associated environments for configuring various software components of a software system. The configuration may be based on the implementation of the software system as a development environment (e.g., including a test environment) or a production environment. A single configuration profile is created for an entire software system, thereby rendering the sequence of configuration tasks obvious and intuitive. The configuration tool enables an administrator or user configuring the software system to import component specific profiles into the configuration profile for a system, thereby enabling use of those profiles for the system configuration.

In order to upgrade to a newer version of a software system, each profile for a specific system component is typically converted using a type of upgrade profile to upgrade each component to the new version required by the software system. However, this process is not straight forward when migrating from component specific profiles to a configuration profile for a system. In particular, each component specific profile includes information related to configuring a specific part of a software or other system. Since a configuration profile for a system is used for configuring an entire development environment or an entire production environment, the configuration profile includes information contained in plural component specific profiles. Thus, these component specific profiles need to be merged in an intuitive and understandable manner within the configuration profile of the system. Further, the component specific profiles may contain overlapping information, or properties shared between the component specific profiles may include different information. Although some information may no longer be relevant in the component specific profile, a user may still desire to migrate useful information remaining within that profile.

One manner of generating the configuration profile for the system includes a user manually reviewing the component specific profiles and copying useful information into a new configuration profile for the system. However, this approach may be time consuming, tedious, and error-prone, especially in the event that plural systems need to be upgraded to a new software version.

An alternative approach includes continued support of component specific profiles. However, this alternative approach foregoes a mechanism to transition into use of the configuration profile for configuring all system components at once.

Present invention embodiments enable importation of tasks and profile properties from component specific profiles into a configuration profile for a system. This profile importation process may be accomplished by a wizard or any other computer-implemented tool or mechanism.

An example computing environment for use with a present invention embodiment is illustrated in FIG. 1. In particular, a computing environment includes an application server system 100, a content server system 110, a workflow server system 120, and one or more client systems 130. The server systems may be physical server systems, or be implemented as virtual server systems residing on the same physical machine or on two or more different physical machines. A configuration profile may be utilized to configure the software components of the application server system, content server system, and/or workflow server system.

Server systems 100, 110, 120 and client system 130 may be remote from each other and communicate over a network 112. The network may be implemented by any number of any suitable communications media (e.g., wide area network (WAN), local area network (LAN), Internet, Intranet, etc.). Alternatively, server systems 100, 110, 120 and client system 130 may be local to each other, and communicate via any appropriate local communication medium (e.g., local area network (LAN), hardwire, wireless link, Intranet, etc.).

Content server system 110 implements a content management system, and manages content or information. The content or information may be stored in a content database system 115. The content database system may be implemented by any conventional or other database or storage unit, may be local to or remote from content server system 110, and may communicate via any appropriate communication medium (e.g., local area network (LAN), wide area network (WAN), Internet, hardwire, wireless link, Intranet, etc.). By way of example only, the content server system may be implemented by an IBM FileNet P8 Content Engine alone or in combination with IBM Content Manager. The content server system further includes object stores 114 (e.g., including a design object store and one or more target object stores) each containing various information 116 pertaining to importation of profiles into a configuration profile and the system configuration.

Workflow server system 120 performs business processes or workflows on content or information from the content server system. A workflow database system 125 stores information pertaining to the processing of the workflows. The workflow database system may be implemented by any conventional or other database or storage unit, may be local to or remote from workflow server system 120, and may communicate via any appropriate communication medium (e.g., local area network (LAN), wide area network (WAN), Internet, hardwire, wireless link, Intranet, etc.). By way of example only, the workflow server system may be implemented by an IBM FileNet P8 Process Engine alone or in combination with IBM Business Process Manager.

Application server system 100 provides various applications to process information from or for the content and/or workflow server systems. The application server system includes a profile module 150 that implements the configuration tool for importing source profiles into a target configuration profile for a system as described below. By way of example only, the application server system may be implemented by an IBM WebSphere Application Server with a configuration profile augmented by IBM Business Space.

By way of further example, the profile module may be included within IBM Case Manager that includes an IBM Case Manager Administration Client, IBM Case Manager Builder, IBM Case Manager Client, and IBM Case Manager Representational State Transfer (REST) Application Programming Interface (API) on the application server system, and an IBM Process Engine server on the workflow server system. The profile module in this type of example implementation may utilize the information within the object stores residing on the content server system, and may process component specific profiles to configure these various software components.

Client systems 130 may present a graphical user (e.g., GUI, etc.) or other interface of the configuration tool (e.g., command line prompts, menu screens, etc.) to solicit information from users pertaining to the desired configuration, and may provide reports or displays including various information.

Server systems 100, 110, 120 and client system 130 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, client/communications/browser software, applications, profile module, etc.).

Profile module 150 may include one or more modules or units to perform the various functions of present invention embodiments described below. The various modules (e.g., profile module, etc.) may be implemented by any combination of any quantity of software and/or hardware modules or units, and may reside within memory 35 of application server system 100 for execution by processor 15.

A configuration profile includes a series of tasks or activities to be performed in order to configure various software components of a software system (e.g., application server system 100, content server system 110, and/or workflow server system 120 of FIG. 1). The tasks of a configuration profile use a shared set of environment properties. Profile properties include properties associated with a configuration profile. These types of properties may include environment properties pertaining to an associated environment (e.g., application server system (e.g., IBM WebSphere Application Server (WAS), etc.) properties, content engine/server system properties, etc.). Profile properties are common to a large quantity of tasks in a profile.

A task includes a configuration activity to perform, and is associated with a collection of task properties required for completion of the configuration activity. A task may further use other properties that are stored in the configuration profile from performance of a configuration activity. A task may be executed, where the task execution may fail or be successful. Moreover, tasks may include a test feature to verify that entered task and/or environment properties are valid before executing a task.

Profile and task properties are each associated with a text field in a configuration profile that receives information entered by a user. Profile and task properties may alternatively employ a drop-down menu or list to enable selection of property information by a user.

A configuration profile is typically implemented as a folder with extensible markup language (XML) files for task and profile properties. Plural profile property files may be used, where each profile property file specifies the profile properties for a different software component (e.g., application server (e.g., WebSphere Application Server (WAS), etc.) properties, content engine/server system properties, etc.). In addition, an extensible markup language (XML) configuration file specifies the name and type of the configuration profile, and the name and types of tasks in the configuration profile. The ordering of tasks in the configuration file indicates the order of execution of those tasks for configuring the software system.

Figure 2A:
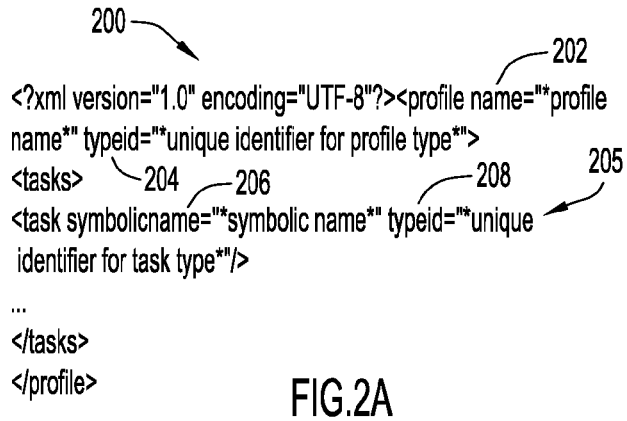
FIG. 2A is an example of a configuration file maintaining tasks and their corresponding ordering for a configuration profile according to an embodiment of the present invention.

An example of a configuration file maintaining tasks within a configuration profile is illustrated in FIG. 2A. Specifically, a configuration file 200 includes a configuration profile name field 202, a configuration profile type identification field 204, and one or more task sections 205. Configuration profile name field 202 includes a user defined configuration profile name, where the directory folder that contains the configuration profile and the file itself typically have the same name as the configuration profile. Configuration profile type identification field 204 includes a unique string identifying the configuration profile type. For example, a configuration profile type identification may include a package name and class name for a JAVA class that implements the configuration profile type.

Each task section 205 is associated with a corresponding task and includes a task symbolic name field 206, and a task type identification field 208. Task symbolic name field 206 includes a unique name for the corresponding task. The symbolic name may further serve as the name of the file containing properties for that task. If more than one copy of a given task type exists, subsequent copies include an additional identifier (e.g., period and version number) to uniquely identify the task. For example, three copies of a task 'configcmos' may be present, where a second copy of the task includes the symbolic name 'configcmos.2' to indicate that the task is represented by the file configcmos.2.xml. Task type identification field 208 includes a unique string to identify the task type (e.g., a package name and the symbolic name for a JAVA class that implements the task type). The ordering of tasks (or task sections 205) within the configuration file indicates the order of execution of those tasks to configure the software system.

Figure 2B:
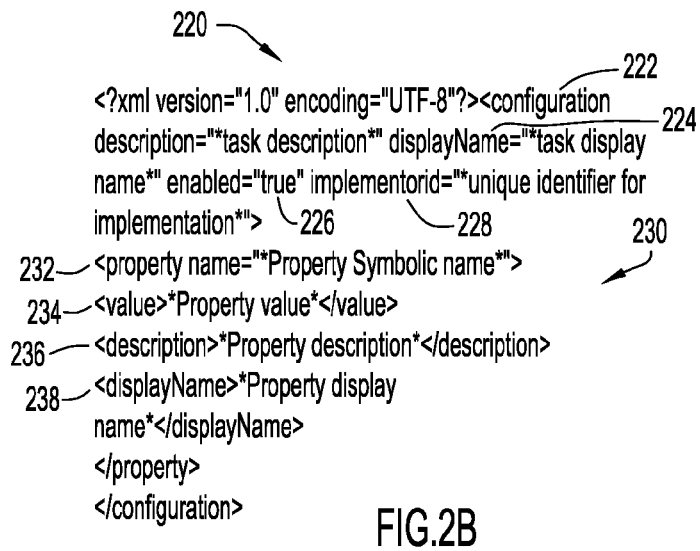
FIG. 2B is an example of a task property file maintaining task properties for a task of a configuration profile according to an embodiment of the present invention.

Task and profile properties are typically represented by extensible markup language (XML) files indicating these properties. The files related to a configuration profile (e.g., profile property files, task property files, etc.) preferably reside in the same directory as the configuration file. An example of a task property file maintaining properties of a corresponding task is illustrated in FIG. 2B. A configuration profile typically includes a task property file for each task. Specifically, a task property file 220 includes a configuration description field 222, a display name field 224, an enable flag field 226, an implementor identification field 228, and one or more task property sections 230. Configuration description field 222 includes a description used for the task that is displayed by the configuration tool of present invention embodiments, and may be translated to the language spoken in the locale of a user. Display name field 224 includes a name for the task that is displayed by the configuration tool of present invention embodiments or on a command line, and may be translated to the language spoken in the locale of a user. Enable flag field 226 includes a flag that indicates a status of the task as enabled or disabled. Disabled tasks cannot be executed until enabled, and are not executed when executing all tasks in a profile. Implementor identification field 228 includes a unique string indicating the type of implementation environment represented by the file. This is useful information since task types may have different implementations. For example, a task implementation may be for a standard deployment (e.g., one unmanaged node), a network deployment (e.g., one node managed by a deployment manager node), or a cluster deployment (e.g., plural nodes managed by a deployment manager node). In addition, there may be various implementations (e.g., IBM DB2, ORACLE, MICROSOFT SQL, etc.), where each implementation may include a different set of properties and some properties may be needed only for specific implementations. By way of example, performance of a standard implementation of a task needs information pertaining to a server node, a server name, and a virtual host, while performance of a cluster implementation of the task needs information pertaining to a cluster name and virtual host.

Task property sections 230 each include a task property name field 232, a task property value field 234, a task property description field 236, and a task property display name field 238. Task property name field 232 includes the symbolic name uniquely identifying a task property type. Task property value field 234 includes a value of the task property. Task property description field 236 includes a string that provides information pertaining to the purpose of the task property and the type of expected values. The description is displayed by the configuration tool of present invention embodiments, and may be translated to the language spoken in the locale of a user. Task property display name field 238 includes a name for the task property that is displayed by the configuration tool of present invention embodiments, and may be translated to the language spoken in the locale of the user.

Figure 2C:
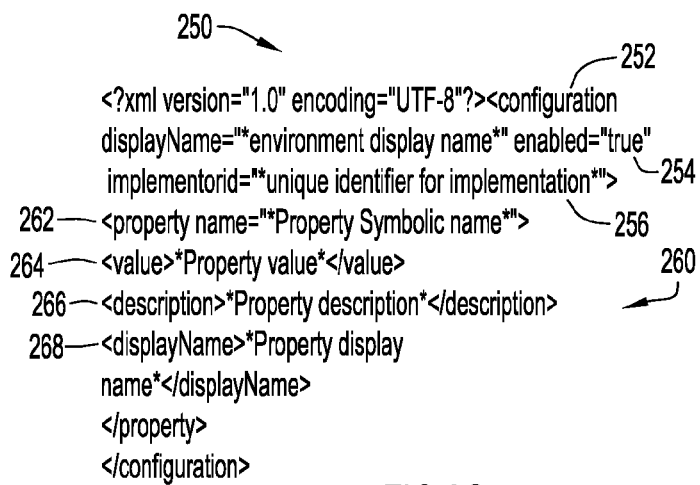
FIG. 2C is an example of a profile property file maintaining profile properties for a configuration profile according to an embodiment of the present invention.

An example of a profile property file maintaining various profile properties including those related to an environment is illustrated in FIG. 2C. A profile property file includes substantially the same format as the task property file described above, except that the implementor identification field tracks the type of profile properties maintained by the file (e.g., properties for the application server system (e.g., WebSphere Application Server (WAS), etc.) and content engine/server system), the configuration description field is absent, and the enable flag field includes a flag with a value preventing disablement of profile properties. Specifically, a profile property file 250 includes a profile property display name field 252, an enable flag field 254, an implementor identification field 256, and one or more profile property sections 260. Profile property display name field 252 includes a name for the property (or environment) that is displayed by the configuration tool of present invention embodiments or on a command line, and may be translated to a language spoken in the locale of the user. Enable flag field 254 includes a flag that indicates the profile properties as enabled or disabled. However, since an embodiment of the present invention does not allow profile properties to be disabled, the flag is typically set to enable the profile properties. Implementor identification field 256 includes a unique string that indicates the type of environment implementation represented by the profile property file. This field is typically utilized for tasks as described above.

Profile property sections 260 each include a profile property name field 262, a profile property value field 264, a profile property description field 266, and a profile property display name field 268. Profile property name field 262 includes the symbolic name uniquely identifying a profile property type. Profile property value field 264 includes a value of the profile property. Profile property description field 266 includes a string that provides information pertaining to the purpose of the profile property and the type of expected values. The profile property description is displayed by the configuration tool of present invention embodiments, and may be translated to a language spoken in the locale of the user. Profile property display name field 268 includes a name for the profile property that is displayed by the configuration tool of present invention embodiments, and may be translated to a language spoken in the locale of the user.

Although task and profile properties may each be represented in a user interface (UI) via a variety of interface elements (e.g., a text field, drop-down menu or list, writable drop-down menu, text box, radio button, etc.), these properties are each ultimately represented by text. This allows for modification of the task and profile properties via editing of the corresponding extensible markup language (XML) files directly.

Individual configuration profiles for a system may be generated to respectively configure the system for a development environment and a production environment. The tasks within these different configuration profiles are generally substantially similar with minor differences since some tasks may be specific to one of the environment types. Further, properties may be assigned different default values based on the environment type. In addition, some tasks (even including the same properties) may have slightly different actions during execution depending on the environment type. This allows for substantially similar configuration profiles to address the specific needs of a development environment or a production environment and be immediately understandable by a user based on an understanding of one of the profiles. Further, each individual configuration profile enables a system to be configured for a desired environment (e.g., development, production, etc.).

Component specific profiles include substantially the same file arrangement (e.g., FIGS. 2A-2C) as described above for a configuration profile, but with only one profile property file. By way of example, IBM Case Manager includes a component specific profile for the IBM Case Manager Builder configuration including one profile property file containing properties for the IBM WebSphere Application Server (e.g., application server system 100), a component specific profile for the IBM Case Manager Client configuration including one profile property file containing properties for the WebSphere Application Server (e.g., application server system 100), and a component specific profile for case deployment including one profile property file containing properties for IBM Content Engine (e.g., content server system 110). The component specific profiles are source profiles for importation into target configuration profiles (e.g., for a development environment or a production environment).

Figure 3:
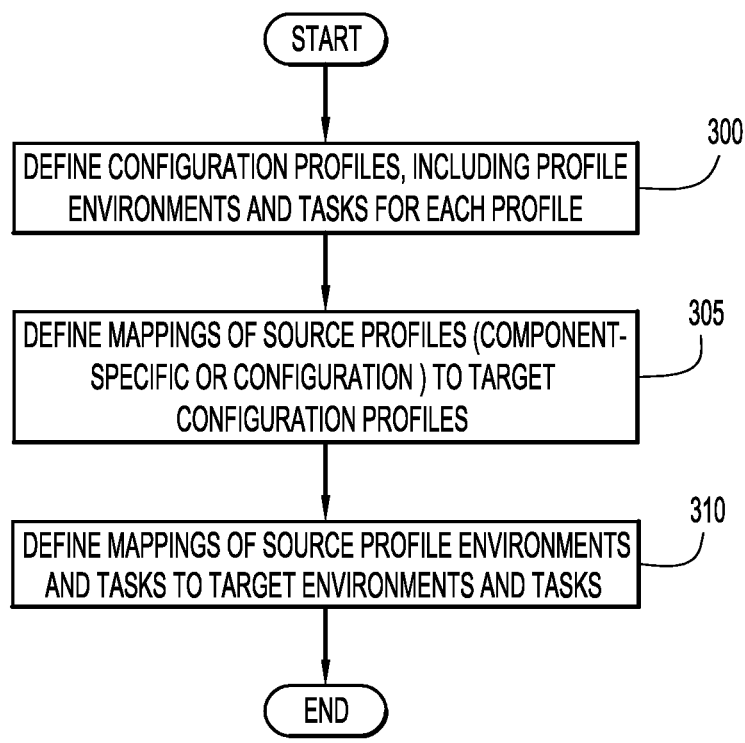
FIG. 3 is a procedural flow chart illustrating a manner in which various elements for importing profiles are determined according to an embodiment of the present invention.

A manner of initializing the configuration tool (e.g., implemented by profile module 150 and application server system 100) for importation of source profiles into a target configuration profile for a system according to an embodiment of the present invention is illustrated in FIG. 3. Initially, one or more configuration profiles are defined for the system at step 300. The configuration profiles include profile environments and tasks (e.g., specified in files for the profiles (e.g., FIGS. 2A-2C)), and may each be directed to a particular environment (e.g., development environment, production environment, etc.).

Once the configuration profiles are generated, mappings are defined between source profiles and target configuration profiles at step 305. The source profiles are to be imported into the target configuration profiles, and may include configuration profiles for systems and/or profiles for specific system components. Thus, an association of compatible profiles is created to indicate eligible profiles to be used as source profiles for corresponding target configuration profiles. Profiles may be mapped to themselves, and restrictions may be placed on associations between source profiles and target configuration profiles.

Mappings between tasks and/or profile environments of the source profiles and tasks and/or profile environments of the target configuration profiles are defined at step 310. The various configuration profiles, definitions, and mappings may be in the form of configuration or other files and loaded into or accessible by the configuration tool of present invention embodiments. Alternatively, the configuration tool may generate the configuration profiles, definitions and mappings based on information from a user.

In order to import source profiles (e.g., component specific and/or configuration profiles) into a target configuration profile for a system, each task property and profile property are required to be associated with a symbolic name. The symbolic names are typically indicated in the files of the corresponding profile as described above (e.g., FIGS. 2B-2C). In this case, two or more properties with the same symbolic name are presumed to have the same usage (e.g., the name of a server, etc.). Further, each task and profile environment are similarly required to be associated with a symbolic name. This symbolic name is typically indicated in the files of the corresponding profile as described above (e.g., FIGS. 2A-2C), and distinguishes an associated task or profile environment from other tasks and profile environments within the same profile. However, the symbolic name may be shared by tasks or profile environments within different profiles provided the symbolic name is unique within a profile. In addition, the definition of a configuration profile includes a list of required profile environments for that configuration profile, and a list of tasks that may be included within the configuration profile. The order of tasks within the task list serves as the default task ordering, and is used to determine the position of tasks created during importation.

Defined mappings between tasks and/or profile environments of source profiles and tasks and/or profile environments of target configuration profiles are typically specified by use of the corresponding symbolic names, and may be implemented using various data structures, provided there exists an association between one source symbolic name and plural target symbolic names. This may be limited to a one-to-one mapping. However, a one-to-many mapping is preferable, and allows a task to be decomposed into smaller portions. A many-to-one or many-to-many mapping is typically not used since different tasks or profile environments may have overlapping properties that may lead to issues of conflict resolution when the overlapping properties have different values.

The same mappings (e.g., between tasks and profile environments of the source profiles and tasks and profile environments of the target configuration profiles) apply regardless of profile type, thereby obviating the need to include redundant mappings for each source profile. A source profile (e.g., files of the source profile (e.g., FIGS. 2A-2C)) is examined for symbolic names for tasks or profile environments used as keys for mapping the source profile to a target configuration profile. The target configuration profile (e.g., files of the target configuration profile (e.g., FIGS. 2A-2C)) is examined for values for the keys (or corresponding symbolic names) of the mapping. A mapping is considered valid when the source profile contains a key and the target configuration profile contains any of the key values. Since additional logic may be used to restrict valid source/target profile type pairings, specificity for these task and profile environment mappings is not needed. In addition, a profile type may be incorporated into the symbolic name of a task to enable two or more similar tasks in different profiles to have different symbolic names. Alternatively, a mapping may be created between the profile type (e.g., source profile, target configuration profile, the pairing of two profiles, etc.) and the task and profile environment mappings, thereby producing a mapping of mappings.

The mapping between a source profile and a target configuration profile ignores tasks and profile environments in the source profile that have not been edited (e.g., only contain default properties). When the target configuration profile supports a plurality of mapped tasks, or an instance of the mapped task has not yet been created, the importation process generates an instance of the task in the proper position (e.g., based on the default ordering for tasks in the profile). If the target configuration profile supports only one copy of a mapped task, or an instance of the mapped task already exists that has not yet been edited (e.g., containing only default values), that task instance is used. If a source profile or a target configuration profile has one or more profile environments, exactly one instance of the profile environment resides in that profile. With respect to tasks, a source profile or a target configuration profile may have zero, one, or more instances of the task. In other words, a source profile or a target configuration profile that supports a given task does not require that task to be in the profile. However, the maximum number of instances of that task in a source profile or a target configuration profile may be limited (e.g., one, etc.) or without restriction.

Figure 4:
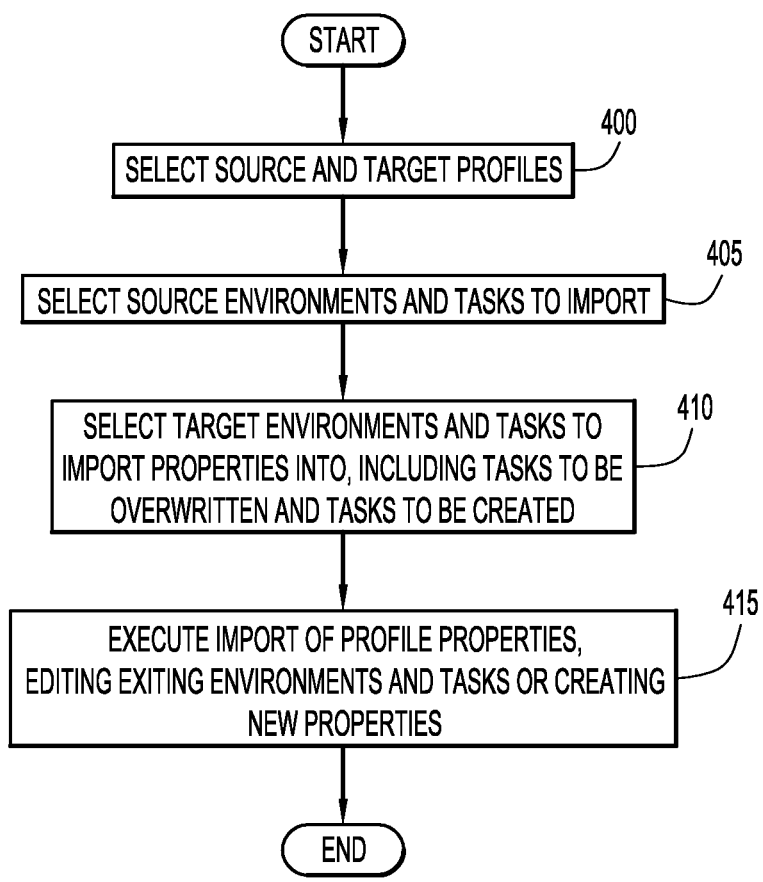
FIG. 4 is a procedural flow chart illustrating a manner in which source profiles are imported into a target configuration profile for a system according to an embodiment of the present invention.

A manner of importing a source profile into a target configuration profile for a system (e.g., via the configuration tool of application server system 100 and profile module 150) is illustrated in FIG. 4. Initially, source and target configuration profiles are selected by a user at step 400. This may be accomplished via the configuration tool of present invention embodiments with various user interface screens as described below (FIGS. 8 and 9A-9F). In particular, the user initially selects a target configuration profile, and subsequently selects a source profile providing the tasks and profile properties for importation. The source profile may be a component specific profile or a configuration profile for a system. The configuration tool produces a list of tasks and profile environments residing within the source profile (e.g., containing groupings of profile properties based on a software component, such as properties for an IBM WebSphere Application Server (e.g., application server system 100) or an IBM Content Engine Server (e.g., content server system 110)).

Tasks and/or profile environments are selected by a user from the list at step 405. The configuration tool displays a list of tasks and/or profile environments that are modified or created based on the selection of tasks and/or profile environments within the source profile. Since a task in the source profile may map to plural tasks in the target configuration profile, only some of these tasks within the target configuration profile may be desired for modification and creation. Thus, the displayed list is useful to inform the user of these task modifications and creations.

The list of tasks and/or profile environments may be generated by traversing the source profile (e.g., files of the source profile (e.g., FIGS. 2A-2C)), and comparing symbolic names of tasks and profile environments within the source profile to keys of the mappings to tasks within the target configuration profile. In order to determine the tasks within the source profile that have been edited, the properties associated with each task in the source profile are compared against a temporary copy of that task (e.g., created for this comparison). If all properties of a task in the source profile match the properties of the corresponding temporary copy of the task, the task is excluded from the list of importable tasks since the task simply contains the initial default values for the task properties (which typically already reside in the target profile).

Once the tasks and profile environments within the source profile have been selected, the tasks and profile environments within the target configuration profile are selected by the user for importation of properties of the selected items from the source profile at step 410. The user may further specify the tasks within the target configuration profile to be created, or have their property values overwritten based on properties from the source profile. A list of the tasks and/or profile environments for modification (or creation) may be generated by iteratively traversing all mappings with keys matching the selected tasks and/or profile environment types, and examining values for each of those mappings against a list of supported tasks for the target configuration profile (e.g., ascertained from the definition for the configuration profile described above). When a target configuration profile supports the task or profile environment type, a list of actual instances of that task or environment profile type are examined. If a mapped entity is a profile environment, the profile environment is listed. When the mapped entity is a task and no copies of that task are present in the target configuration profile, the task is flagged for creation in response to user selection of the mapping for importation.

If the target configuration profile is limited to a maximum of one copy of the mapped task, and a copy of that task already exists or a copy of the task exists with only default values (e.g., based on the comparison with a temporary copy of the task as described above), the existing task is modified with the properties of the corresponding task and/or profile environment from the source profile. When the target configuration profile supports plural copies of the mapped task, and there are no existing copies of the task that use only default values, a new copy of the task is flagged for creation in response to user selection of the mapping for importation.

The importation of the properties of the selected tasks and profile environments from the source profile into the target configuration profile is performed at step 415. This includes editing existing tasks and/or profile environments within the target configuration profile and/or creating new tasks and/or properties within the target configuration profile. The user selects the mappings between the tasks and/or profile environments of the source profile and target configuration profile to use for the importation. This may be accomplished via user interface screens of the configuration tool as described below.

Once the mappings are selected, the selected mappings are traversed, where properties of the task and/or profile environment of the source profile (e.g., specified in the files of the source profile (e.g., FIGS. 2A-2C)) are compared to corresponding properties of the task and/or profile environment of the target configuration profile (e.g., specified in the files of the target configuration profile (e.g., FIGS. 2A-2C) and with new instances of tasks created as described above). If the symbolic name of a property of the task and/or profile environment within the source profile matches a symbolic name of a property of the task and/or profile environment within the target configuration profile, the value of the property from the source profile is used for the property of the target configuration profile. This comparison is performed for each mapped task and/or profile environment property of the source profile and target configuration profile. The above importation process may be repeated for additional source profiles to import into the target configuration profile.

The above importation process generally imports containers of properties (e.g., tasks, profile environments, etc.), rather than importing individual properties. However, properties may be imported on any desired level (e.g., task, profile environment, individual property level, etc.).

Figure 5:
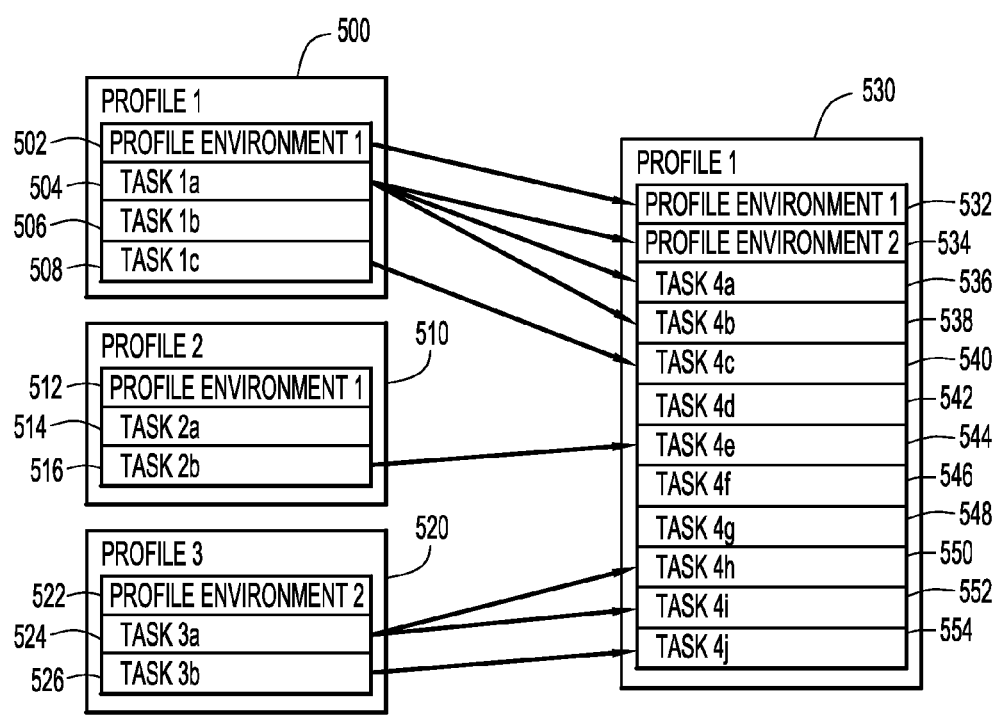
FIG. 5 is a diagrammatic illustration of importing source profiles into a target configuration profile for a system according to an embodiment of the present invention.

An example of an importation of source profiles into a target configuration profile for a system is illustrated in FIG. 5. Initially, the source profiles include profiles 500, 510, and 520. These profiles may include any quantity or combination of component specific profiles, or configuration profiles for a system. Profile 500 (e.g., Profile 1 as viewed in FIG. 5) includes a profile environment 502 (e.g., Profile Environment 1 as viewed in FIG. 5) and a series of tasks 504, 506, and 508 (e.g., Tasks 1a-1c as viewed in FIG. 5), while Profile 510 (e.g., Profile 2 as viewed in FIG. 5) includes a profile environment 512 (e.g., Profile Environment 1 as viewed in FIG. 5) and a series of tasks 514 and 516 (e.g., Tasks 2a-2b as viewed in FIG. 5). Profile 520 (e.g., Profile 3 as viewed in FIG. 5) includes a profile environment 522 (e.g., Profile Environment 2 as viewed in FIG. 5) and a series of tasks 524 and 526 (e.g., Tasks 3a-3b as viewed in FIG. 5).

Target configuration profile 530 (e.g., Profile 4 as viewed in FIG. 5) represents the profile resulting from importation of profiles 500, 510, and 520, and includes profile environments 532 and 534 (e.g., Profile Environment 1 and Profile Environment 2 as viewed in FIG. 5) and a series of tasks 536-554 (e.g., Tasks 4a-4j as viewed in FIG. 5). Profile environment 532 of target configuration profile 530 is the same type of profile environment as profile environments 502, 512 within respective source profiles 500, 510, while profile environment 534 of target configuration profile 530 is the same type of profile environment as profile environment 522 of source profile 520. The arrows within FIG. 5 represent example mappings between source profiles 500, 510, 520 and target configuration profile 530. For example: task 504 of source profile 500 has properties that may be used for profile environment 532 and tasks 536 and 538 of target configuration profile 530; task 508 of source profile 500 has properties that may be used for task 540 of target configuration profile 530; task 516 of source profile 510 has properties that may be used for task 544 of target configuration profile 530; task 524 of source profile 520 has properties that may be used for tasks 550, 552 of target configuration profile 530; and task 526 of source profile 520 has properties that may be used for task 554 of target configuration profile 530. The properties of source profiles 500, 510, 520 are utilized for the corresponding entities (e.g., profile environment, tasks, etc.) of target configuration profile 530 in accordance with the mappings in order to perform the importation.

Figure 6:
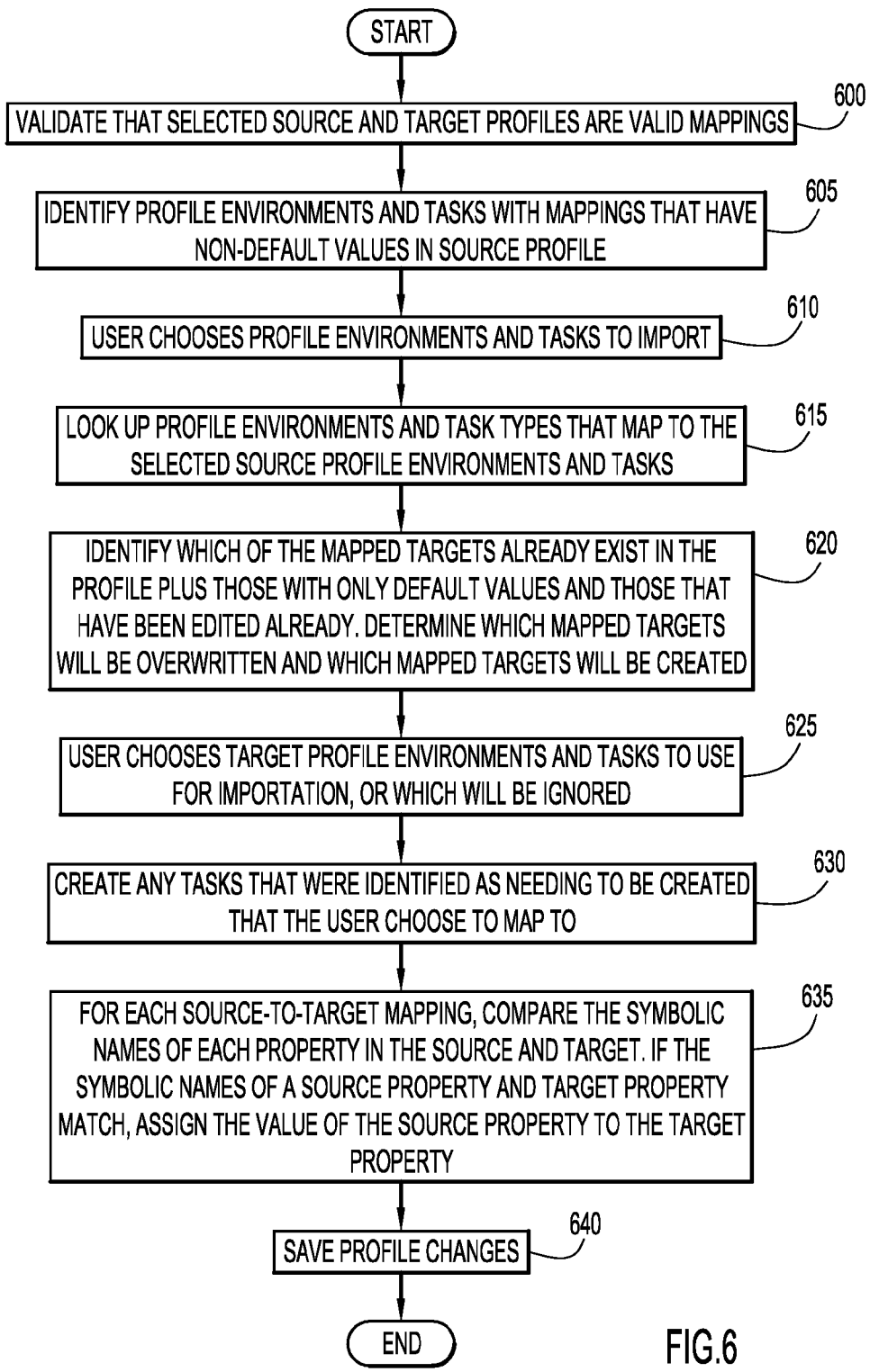
FIG. 6 is a procedural flow chart illustrating a manner of importing properties of source profiles into a target configuration profile for a system according to an embodiment of the present invention.

A manner of importing properties from a source profile to a target configuration profile for a system (e.g., via profile module 150 and application server system 100 and/or client system 130) according to an embodiment of the present invention is illustrated in FIG. 6. Initially, a source profile and a target configuration profile are selected by a user as described above (e.g., corresponding to step 400 of FIG. 4). This may be accomplished via the configuration tool of present invention embodiments with various user interface screens as described below (FIGS. 8 and 9A-9F). The selected source profile and target configuration profile are examined to determine the presence of valid mappings between these profiles at step 600. The determination of valid mappings between the source profile and target configuration profile is based on key values of the mappings as described above.

Tasks and profile environments in the source profile that have mappings to the target configuration profile and include non-default values are identified at step 605. The user selects identified tasks and/or profile environments from a list at step 610 as described above (e.g., corresponding to step 405 of FIG. 4), and the profile environments and task types for the target configuration profile that are mapped to the selected source profile environments and tasks are identified based on the mappings at step 615. The presence of the mapped entities (e.g., profile environments, tasks, etc.) within the target configuration profile is determined at step 620. In addition, mapped entities that contain only default values and mapped entities that have been previously edited are further identified. The mapped entities designated for modification or overwriting of property values, and mapped entities designated for creation are identified as described below (FIG. 7).

Tasks and profile environments of the target configuration profile to use for the importation are selected by the user at step 625. In addition, the profile environments and tasks of the target configuration profile to be ignored are further selected by the user. Tasks that are to be created in the target configuration profile in response to user selection of the corresponding mapping are created at step 630. For each mapping, the symbolic name for each property in the source profile is compared to the symbolic name for each property in the target configuration profile at step 635 (e.g., where the symbolic names are typically indicated in the files of these profiles (e.g., FIGS. 2A-2C)). If a symbolic name for a property from the source profile matches the symbolic name of a property from the target configuration profile, the value of the property from the source profile is assigned to the corresponding property in the target configuration profile.

Once the property values have been assigned, the changes to the target configuration profile are stored at step 640. This is typically accomplished by producing and/or modifying the appropriate files of the target configuration profile (e.g., FIGS. 2A-2C), and storing the files in the corresponding directory to generate a resulting target configuration profile with the imported source profiles. The above importation process may be repeated for additional source profiles to import into the target configuration profile.

Figure 7:
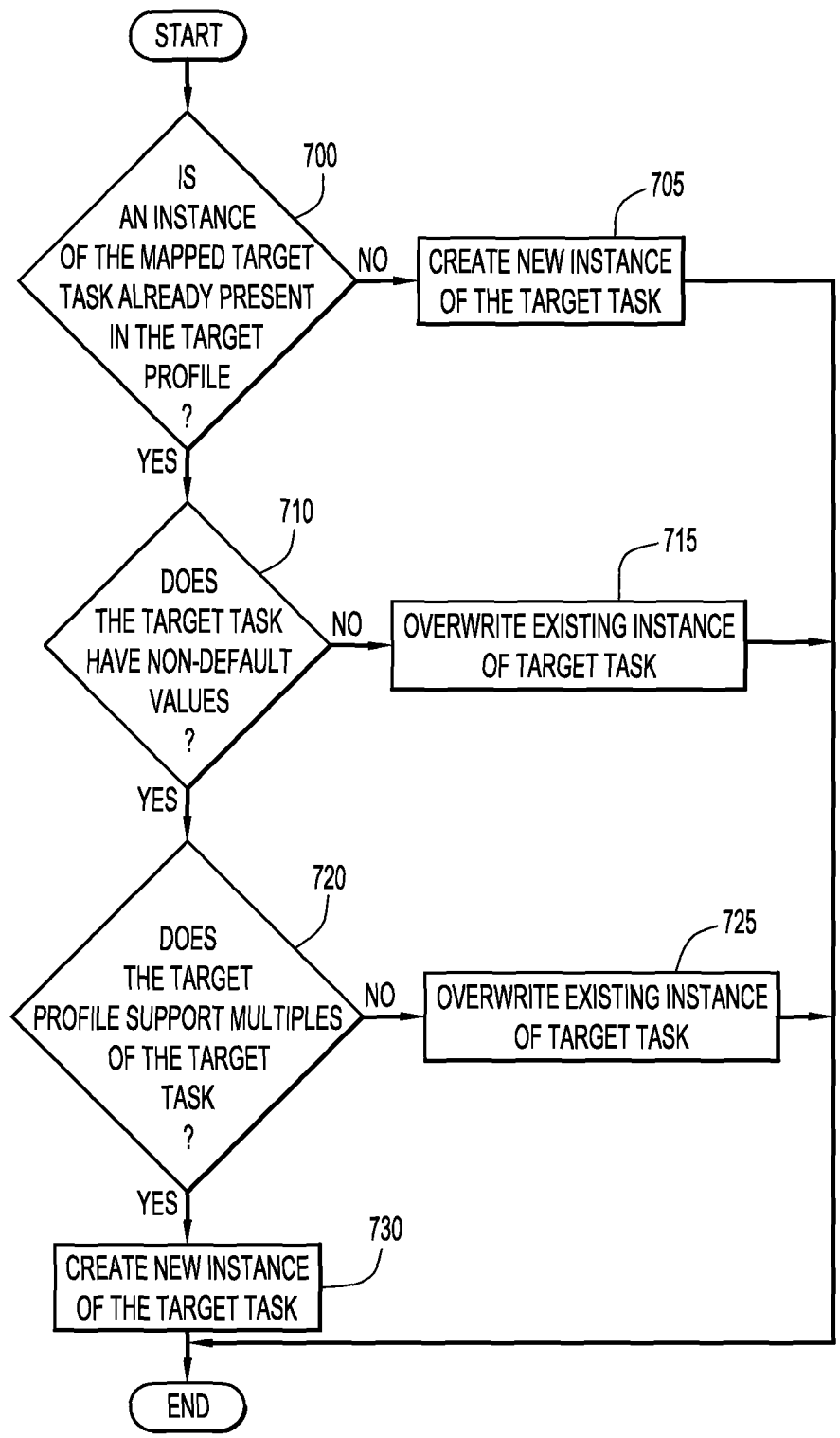
FIG. 7 is a procedural flow chart illustrating a manner of importing tasks from source profiles into a target configuration profile for a system according to an embodiment of the present invention.

A manner of determining a course of action (e.g., modification or creation) for a mapped task (e.g., via profile module 50 and application server system 100 and/or client system 130) during the importation (e.g., corresponding to step 620 of FIG. 6) is illustrated in FIG. 7. Initially, a task eligible for a target configuration profile (e.g., indicated in the target configuration profile definition) that is mapped to a selected task of a source profile is identified during importation as described above (e.g., corresponding to step 615 of FIG. 6). The presence of the mapped task within the target configuration profile is determined at step 700. If the mapped task is not present within the target configuration profile, a new instance of the task with property values from the corresponding task within a source profile is created within the target configuration profile at step 705 (e.g., by producing and/or modifying the appropriate files of the target configuration profile (e.g., FIGS. 2A-2C)).

When the mapped task is present in the target configuration profile, the presence of non-default values within the task is determined at step 710. If the mapped task includes only default values, the property values of the mapped task within the target configuration profile are modified or overwritten with property values from the corresponding task within the source profile at step 715 (e.g., by producing and/or modifying the appropriate files of the target configuration profile (e.g., FIGS. 2A-2C)).

When the mapped task includes non-default values, and the target configuration profile supports a single instance of the mapped task as determined at step 720, the property values of the mapped task within the target configuration profile are modified or overwritten with property values from the corresponding task within the source profile at step 725 (e.g., by producing and/or modifying the appropriate files of the target configuration profile (e.g., FIGS. 2A-2C)). If the mapped task includes non-default values, and the target configuration profile supports plural instances of the mapped task, one or more new instances of the mapped task (with property values from the corresponding task within a source profile) are created in accordance the supported quantity of task instances at step 730 (e.g., by producing and/or modifying the appropriate files of the target configuration profile (e.g., FIGS. 2A-2C)).

A manner of importing source profiles into a target configuration profile for a software system (e.g., via the configuration tool of application server system 100 and profile module 150) is illustrated in FIGS. 8, and 9A-9F. By way of example only, the target configuration profile pertains to configuration of an example application server system 100 (e.g., IBM WebSphere Application Server) and an example content server system 110 (e.g., IBM FileNet P8 Content Engine) for a development environment. However, the configuration tool may be utilized to configure software components of any desired software system for any desired type of environment in substantially the same manner described below.

The configuration tool is preferably initiated from, and displays a series of graphical user interface screens on, a client system 130 (FIG. 1) to enable importation of one or more source profiles into the target configuration profile (e.g., using a remote desktop or telnet application to interface the configuration tool executing on the application server, etc.). Initially, a configuration profile is selected that serves as the target configuration profile for the importation of properties from one or more source profiles (e.g., component specific or other configuration profiles). The configuration tool may include different portions to process profiles, where the same or different portions may be utilized to open a target configuration profile and perform the importation. Alternatively, the configuration tool may enable concurrent selection of source and target configuration profiles.

Figure 8:
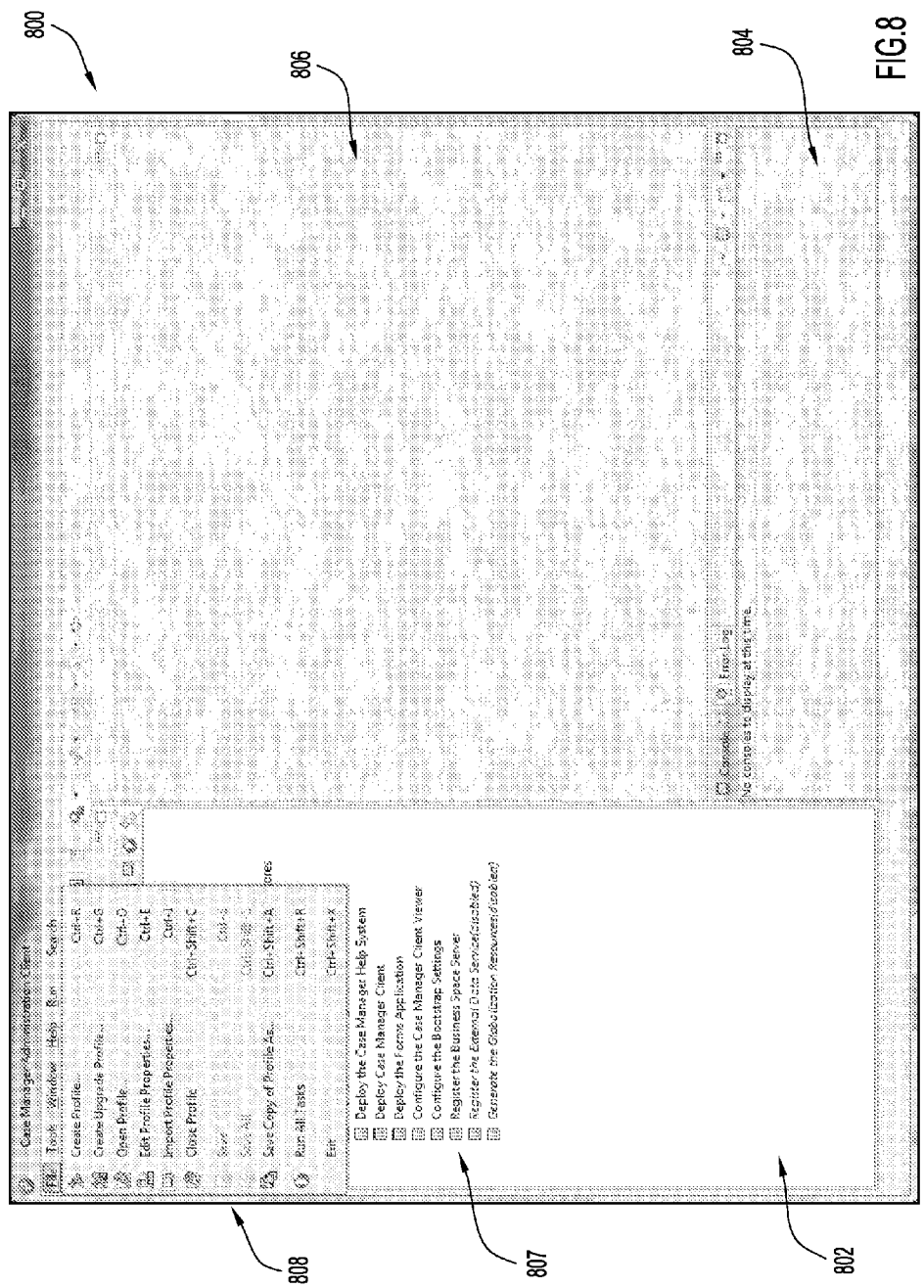
FIG. 8 is an illustration of an example graphical user interface screen for initiating importation of source profiles into a target configuration profile for a system according to an embodiment of the present invention.

A manner of initially selecting a target configuration profile for importation of source profiles is illustrated in FIG. 8. Initially, a target configuration profile may be selected and corresponding tasks may be managed via task management user interface screen 800. This screen is initiated from the configuration tool and provides information for an existing configuration profile. The selection of a target configuration profile may be accomplished via a file or other drop-down menu (e.g., including an open operation) on task management screen 800, or a user interface (e.g., user interface screen, command line prompt, or other interface mechanism) enabling a user to select a desired target configuration profile.

In particular, task management screen 800 includes a task area 802, a task status area 804, and a task information area 806. Task area 802 displays a list of tasks 807 of the selected target configuration profile. By way of example only, the example target configuration profile and associated tasks pertain to IBM Case Manager Administration Client and IBM Case Manager products. However, the task management screen may be utilized for and include information pertaining to any desired configuration profile, corresponding tasks, and software products.

A task may be selected from task list 807 (e.g., via actuation of a mouse or other input device) for processing. Task status area 804 provides a status for a selected task, while task information area 806 provides information for a selected task. Task information area 806 may vary, and provides information associated with a task selected from task list 807.

Task management screen 800 enables various operations to be performed for a selected task, and may further initiate importation of source profiles into the selected target configuration profile. These various operations may be initiated from a drop-down operations menu 808. For example, an import profile properties action may be selected from operations menu 808 to initiate the importation.

Once a target configuration profile has been selected and importation initiated (e.g., via task management screen 800 of FIG. 8), an introductory user interface screen 900 (FIG. 9A) is displayed. Introductory screen 900 includes an information area 905 providing information pertaining to importation of source profiles into a target configuration profile, and a series of actuators 910 disposed toward a bottom portion of the user interface screen. Actuators 910 include a back button 912, a next button 914, a finish button 916, and a cancel button 918. Back and next buttons 912, 914 enable navigation to respective prior and subsequent user interface screens within the series. Finish button 916 terminates the session and applies user actions performed during the session to the selected target configuration profile, while cancel button 918 terminates the session without applying the actions to the selected target configuration profile. Since introductory screen 900 is the initial screen in the series, back and finish buttons 912, 916 are typically disabled for this screen.

Once next button 914 is actuated from introductory screen 900, an import profile selection screen 920 (FIG. 9B) is displayed to receive information from a user pertaining to a source profile to import into the selected configuration profile. This screen may further be displayed in response to actuation of a back button on a successive screen in the series. Import profile selection screen 920 enables a user to specify the location of the source profile to import and includes a field area 925, and series of actuators 910 disposed toward a bottom portion of the profile information screen. Actuators 910 include back button 912, next button 914, finish button 916, and cancel button 918 each as described above. Field area 925 includes fields to receive information from a user pertaining to a source profile to import. By way of example, the fields include a profile path field 922 with an adjacent browse actuator 924 to enable graphical selection of a directory for this field.

Profile path field 922 is associated with a directory containing the desired source profile to import. Since import profile selection screen 920 is an intermediate screen in the series, finish button 916 is typically disabled for this screen.

Figure 9A:
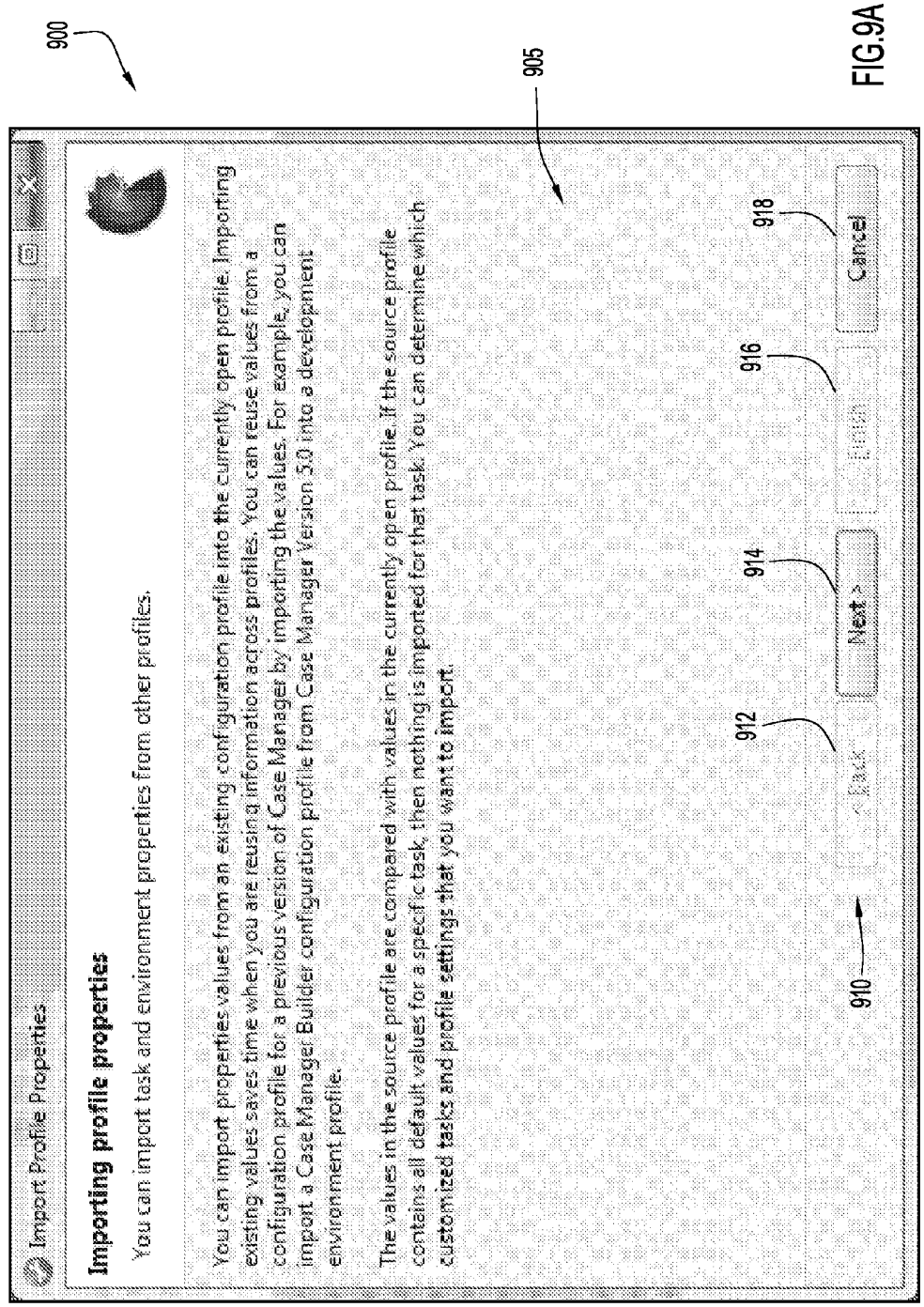
FIG. 9A is an illustration of an example graphical user interface screen for importing a source profile into a target configuration profile for a system according to an embodiment of the present invention.
Figure 9B:
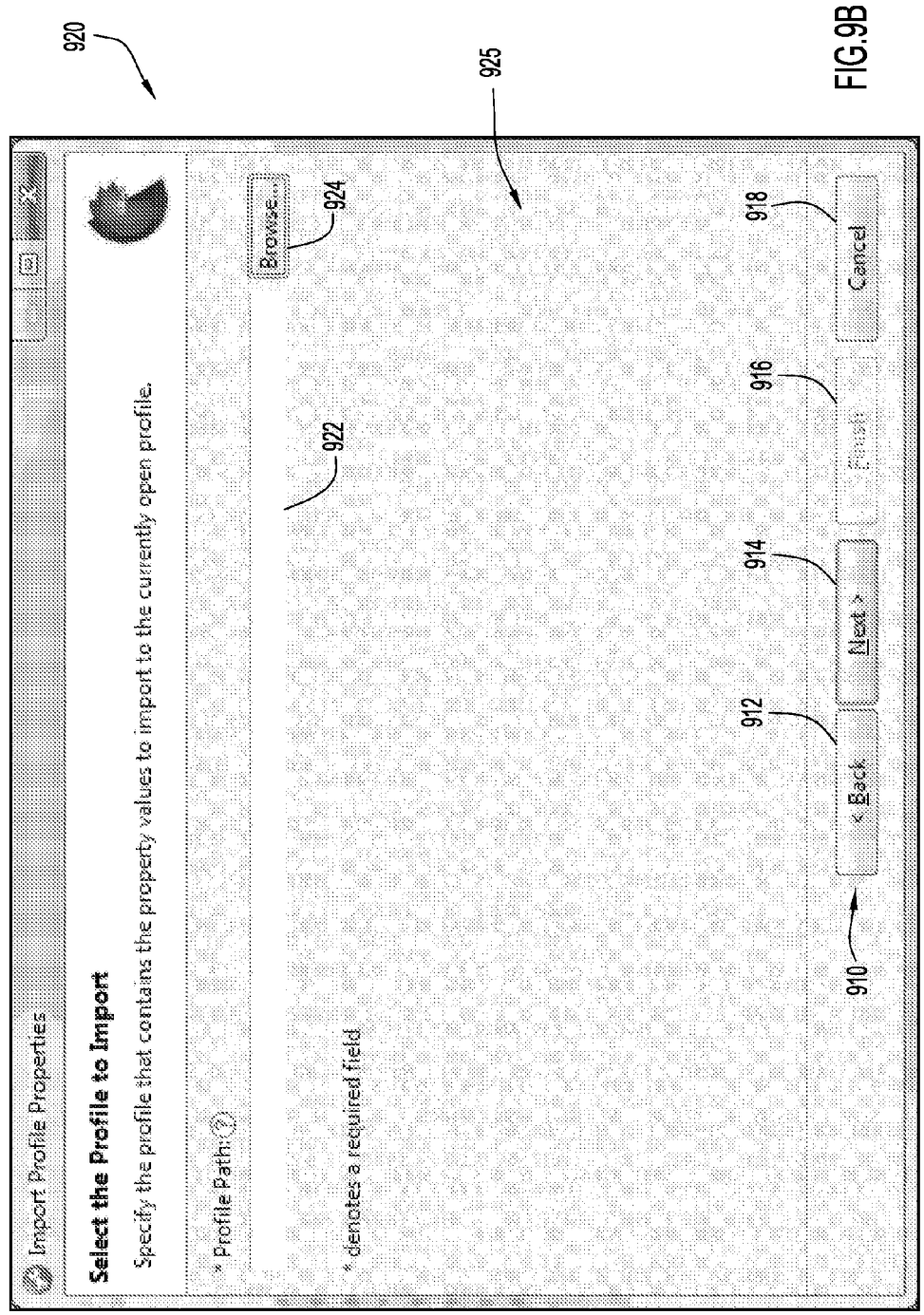
FIG. 9B is an illustration of an example graphical user interface screen enabling selection of a source profile for importation into a target configuration profile for a system according to an embodiment of the present invention.
Figure 9C:
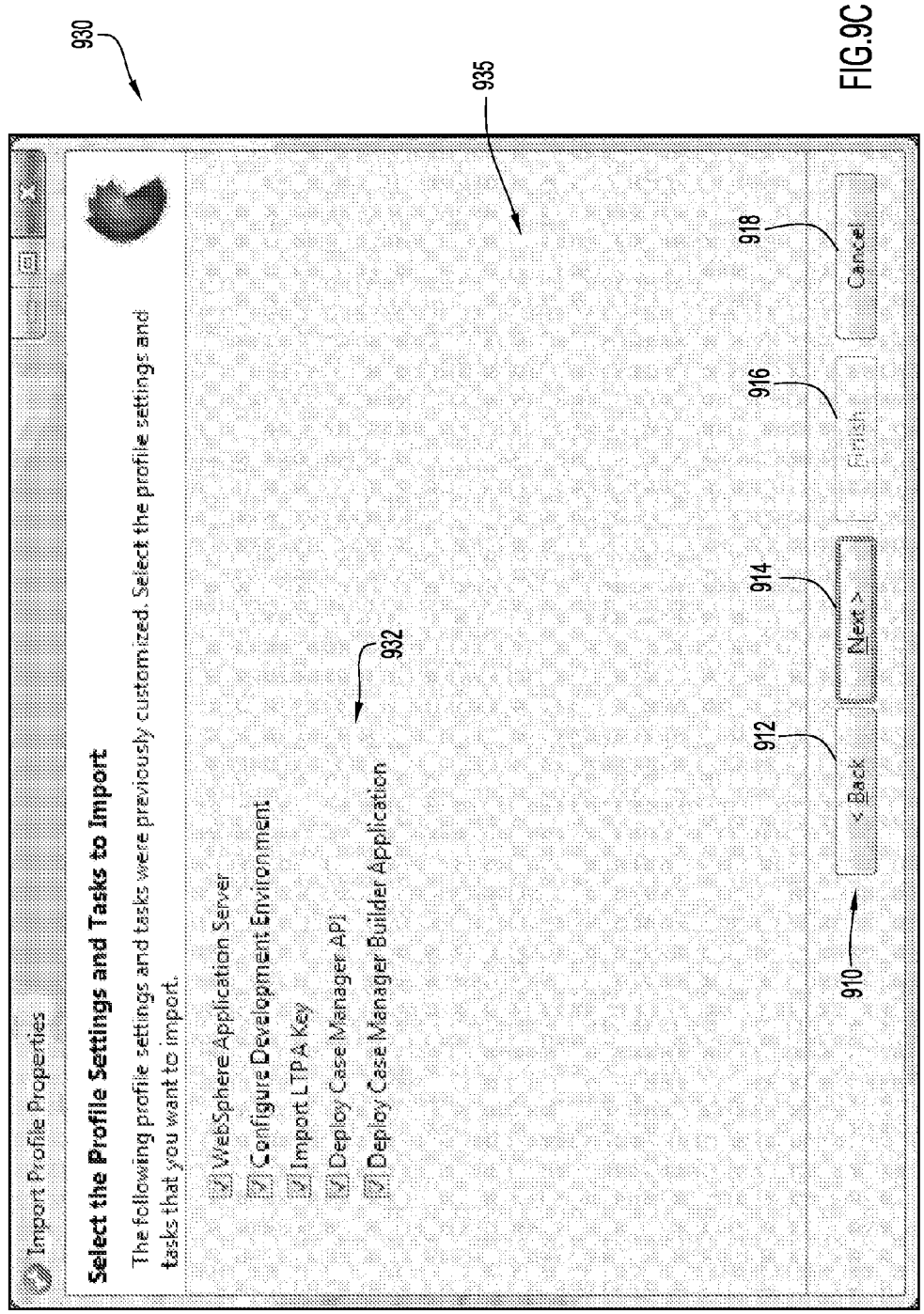
FIG. 9C is an illustration of an example graphical user interface screen enabling selection of tasks and/or profile environments of a source profile for importation into a target configuration profile for a system according to an embodiment of the present invention.

Information for the tasks and profile environments of the selected source profile to be imported into the target configuration profile may be received via an import selection user interface screen 930 (FIG. 9C). This screen may be traversed in response to actuation of back or next buttons on respective successive and prior user interface screens in the series. In particular, import selection screen 930 includes a field area 935, and series of actuators 910 disposed toward a bottom portion of the user interface screen. Actuators 910 include back button 912, next button 914, finish button 916, and cancel button 918 each as described above. Field area 935 includes a list of entities 932 associated with the tasks and profile environments of the source profile to be imported into the target configuration profile (e.g., determined from prior submitted information described above (e.g., FIGS. 3 and 6)), and corresponding selection fields (e.g., check boxes) to enable a user to select specific tasks and/or profile environments of the source profile for importation into the target configuration profile. The tasks are typically implemented by scripts or program applications that perform corresponding activities for configuring one or more software components and/or a software system. The tasks are typically loaded into the application server system for selection. Since import selection screen 930 is an intermediate screen in the series, finish button 916 is typically disabled for this screen.

By way of example, import selection screen 930 represents within entity list 932 a scenario where IBM WebSphere Application Server is the profile environment, and a single component profile serves as a selected source profile (e.g., a profile for IBM Case Manager Builder). The remaining displayed selections within entity list 932 are various tasks (e.g., Configure Development Environment, Import Lightweight Third-Party Authentication (LTPA) Key, Deploy Case Manager Application Programming Interface (API), and Deploy Case Manager Builder Application). The profile environments and tasks that are displayed actually include data or non-default property values. Although other tasks may exist in the source profile, these tasks are not displayed since the tasks contain only default values (e.g., no user-entered or non-default values).

Figure 9D:
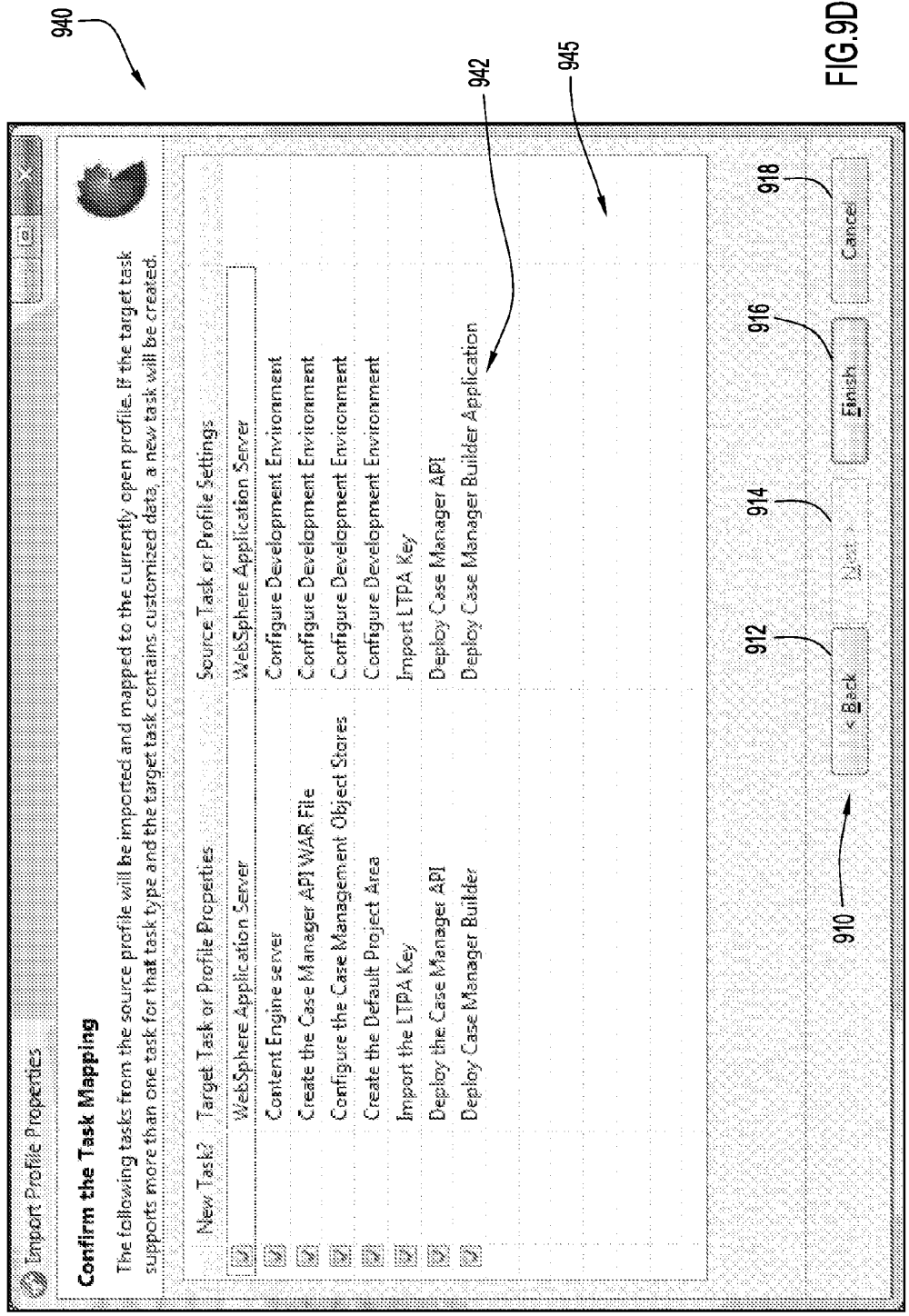
FIG. 9D is an illustration of an example graphical user interface screen enabling confirmation of mappings for importation of task and/or profile environments of a source profile into a target configuration profile for a system according to an embodiment of the present invention.
Figure 9E:
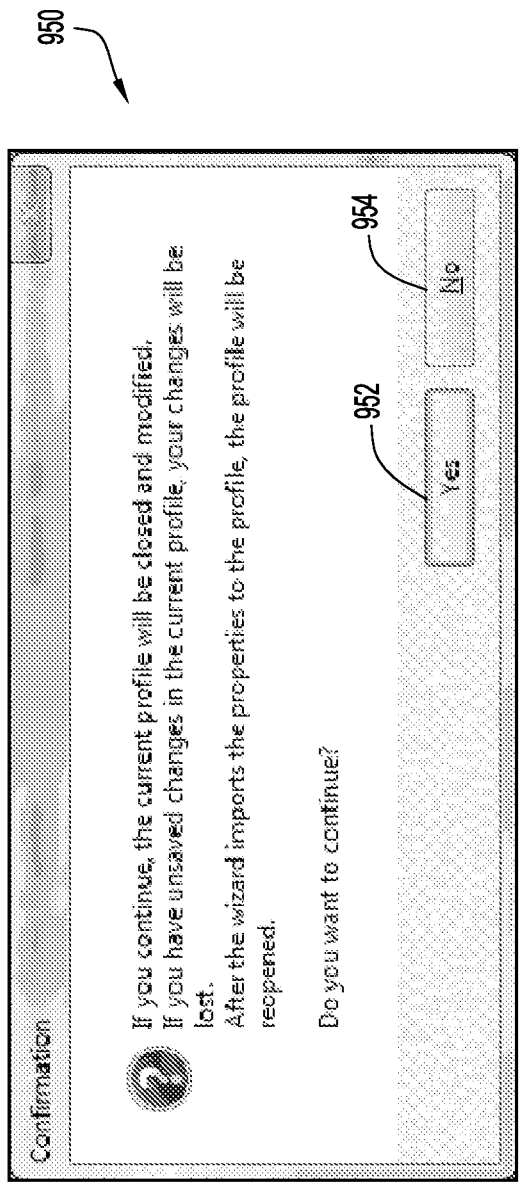
FIG. 9E is an illustration of an example graphical user interface screen enabling confirmation of modification of a target configuration profile for a system according to an embodiment of the present invention.
Figure 9F:
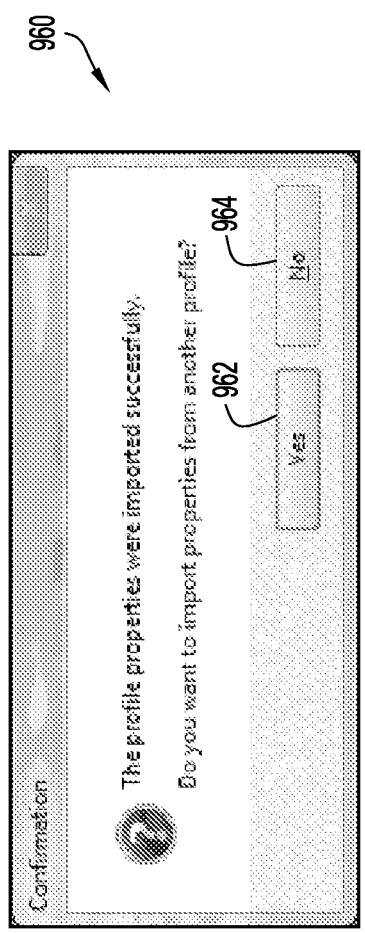
FIG. 9F is an illustration of an example graphical user interface screen indicating successful importation according to an embodiment of the present invention.

Information for the mappings between tasks and/or profile environments of the selected source profile and target configuration profile may be provided via a mapping user interface screen 940 (FIG. 9D). This screen may be traversed in response to actuation of a next button on a prior user interface screen (e.g., import selection screen 930) in the series. In particular, mapping screen 940 includes a field area 945, and series of actuators 910 disposed toward a bottom portion of the user interface screen. Actuators 910 include back button 912, next button 914, finish button 916, and cancel button 918 each as described above. Field area 945 includes a listing of mappings 942 preferably in a table type format. The mapping listing includes columns for the task or profile properties of the target configuration profile, the task or profile properties of the source profile to be imported, an indicator for creation of new tasks within the target configuration profile, and a selection field to enable the importation for the mappings. Each row of the table indicates a mapping between the task or profile properties of the source profile indicated in the source task or profile settings column and the task or profile properties of the target configuration profile indicated in the target task or profile properties column, while the new task indicator includes a value (e.g., Yes, No, Y, N, 1, 0, etc.) that indicates whether or not a new task is to be created in the target configuration profile in response to the target configuration profile supporting more than one task of the indicated task type. The selection field for each row is preferably in the form of a check box that enables or disables importation for the corresponding mapping. Since the mapping screen is generally the terminal user interface screen in the series, next button 914 is disabled, while finish button 916 is enabled to perform the importation.

Mapping screen 940 displays the previously selected tasks and/or profile environments of the source profile (e.g., from import selection screen 930) and the corresponding tasks and/or profile environments of the target configuration profile to which the selected items are mapped. A user may enable or disable importation for a specific task and/or profile environment of the source profile via a corresponding selection field (e.g., generating or clearing a check mark), while the new task indicator indicates that a new task is to be created for the mapping within the target configuration profile as a result of the importation (e.g., the indicator is generally applicable to tasks (and not to profile environments)).

The creation of a new task within the target configuration profile is performed in substantially the same manner described above for FIG. 7. Briefly, if a mapped task is not present in the selected target configuration profile, a new task is created within the selected target configuration profile with properties from the corresponding task within the source profile. When a mapped task is present within the selected target configuration profile and contains only default values, the property values of the existing task are replaced with the property values from the corresponding task within the source profile being imported. If a mapped task is present within the selected target configuration profile and contains other than default values (e.g., user-specified values or non-default values) and the selected target configuration profile supports a plurality of that type of task, a new task is created within the selected target configuration profile with the properties of the corresponding task from the source profile. In addition, when a mapped task is present within the selected target configuration profile, includes non-default values, and the selected target configuration profile does not support a plurality of that type of task, the existing task is overwritten with the properties of the corresponding task from the source profile.

Further, a task of a source profile may map to plural tasks and/or profile environments of a target configuration profile as described above (e.g., FIG. 5). For example, a task (e.g., Configure Development Environment) may perform various actions that may be decomposed into individual activities. One or more of the activities (e.g., configure IBM Case Manager Builder on the development environment) may require information from different profile environments (e.g., IBM WebSphere Application Server and IBM Content Engine Server). In this case, the task (e.g., Configure Development Environment) may map to each of the different profile environments (e.g., IBM WebSphere Application Server and IBM Content Engine Server).

By way of example, mapping screen 940 represents within mapping listing 942 a scenario where IBM WebSphere Application Server and IBM Content Engine Server are the profile environments, and the remaining displayed selections are various tasks (e.g., Configure Development Environment, Import Lightweight Third-Party Authentication (LTPA) Key, Deploy Case Manager Application Programming Interface (API), Deploy Case Manager Builder Application, Create the Case Manager Application Programming Interface (API) Web Application Archive (WAR) File, Configure the Case Management Object Stores, Create the Default Project Area, etc.).

Once the information for the importation is received and finish button 916 is actuated from mapping screen 940, a confirmation user interface screen 950 (FIG. 9E) is displayed requesting confirmation for the importation. Confirmation screen 950 includes a confirm (e.g., or "Yes") button 952 and an abort (e.g., or "No") button 954 disposed toward the bottom portion of the user interface screen. Actuation of abort button 954 cancels the importation, and changes to the selected target configuration profile are not applied.

Actuation of confirm button 952 enables performance of the importation and re-opening of the selected target configuration profile with the imported properties. The configuration tool performs the importation (e.g., creation of tasks, updating of properties for tasks and/or profile environments, etc.), produces and/or modifies the appropriate files of the selected target configuration profile (e.g., FIGS. 2A-2C), and stores the files in the corresponding directory to generate a resulting target configuration profile with the imported source profile. Thus, the resulting target configuration profile includes information to configure various system components, thereby enabling configuration of an entire system from that configuration profile.

After successful completion of the importation, a status user interface screen 960 (FIG. 9F) is displayed indicating the successful importation, and requesting a desire to import additional properties from another source profile into the selected target configuration profile. Status screen 960 includes an enable import (e.g., or "Yes") button 962 and a terminate (e.g., or "No") button 964 disposed toward the bottom portion of the user interface screen. Actuation of enable import button 962 displays task management screen 800 (FIG. 8) to enable selection of another source profile for importation of tasks and/or profile environments into the selected target configuration profile in substantially the same manner described above. Actuation of terminate button 964 enables termination of importation, and may further perform various actions (e.g., exit the configuration tool, return to task management screen 800 (FIG. 8) for various actions (e.g., task management, selection of another target configuration profile, etc.)).

In the event the importation is not successful or encounters an error, a message or user interface screen is displayed to provide notification of this event and/or potential causes of the error. The user interface screen may be substantially similar to status user interface screen 960 described above, and provides notification of the unsuccessful importation and/or encountered error.

It will be appreciated that the embodiments described above and illustrated in the drawings represent only a few of the many ways of implementing embodiments for importing profiles for configuring specific system components into a configuration profile for the system.

The computing environment or system for the present invention embodiments may include any number of computer or other processing systems (e.g., client systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile module, etc.). These systems may include any types of monitors and input devices (e.g., keyboard, mouse, voice recognition, etc.) to enter and/or view information. In addition, the computer systems may host any quantity of any physical or virtual servers.

It is to be understood that the software (e.g., profile module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., profile module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The computing environment or system may employ any number of any conventional or other databases, data stores or storage structures (e.g., files, databases, data structures, data or other repositories, etc.) to store any desired information (e.g., content, configuration files, task property files, profile property files, etc.). The database systems and object stores may be implemented by any number of any conventional or other databases, data stores or storage structures (e.g., files, databases, data structures, data or other repositories, etc.) to store any desired information. The database systems may be included within or coupled to the server and/or client systems. The database systems and/or storage structures may be remote from or local to the computer or other processing systems, and may store any desired data.

The configuration profile may be utilized to configure any quantity of system components to configure a system, and preferably configures two or more different system components. A system may be associated with any quantity of configuration profiles, each configuring the system for a different environment or mode of operation. Further, a configuration profile may be associated with and used to configure any quantity of systems. The system may include any quantity of any types of components (e.g., hardware components, software components, controlled mechanical components, etc.). The configuration profile may configure a system for any desired environment or operational mode (e.g., production environment, test environment, development environment, simulation, etc.).

The configuration profile may be associated with any quantity of files or other storage structures to store information for the configuration profile. The configuration profile may include any quantity of configuration files, task property files, and profile property files. The task property file may be associated with any quantity of tasks and/or configuration profiles, while the profile property file may be associated with any quantity of configuration profiles. The configuration file may be of any type (e.g., XML, text, etc.), format or arrangement, and include any quantity of any desired information (e.g., tasks, names, identifiers, etc.). The task property file may be of any type (e.g., XML, text, etc.), format or arrangement, and include any quantity of any desired information (e.g., tasks, names, identifiers, properties, values, etc.). The profile property file may be of any type (e.g., XML, text, etc.), format or arrangement, and include any quantity of any desired information (e.g., names, identifiers, properties, values, environments, etc.).

The files of a configuration profile (e.g., configuration file, task property file, profile property file, etc.) may be stored in any desired location areas (e.g., folder, directory, etc.), where these file may be stored within the same location area or dispersed among any quantity of different location areas (within the same or different storage systems). The fields of the configuration, task property, and profile property files may be of any quantity, type, or format (e.g., string, numeric, Boolean, etc.), and may include any desired information with any desired values. The enable flag may include any desired values to indicate enablement or disablement of a task or property (e.g., true, false, 1, 0, etc.).

The configuration tool of the present invention embodiments may employ any number of any type of user interface (e.g., Graphical User Interface (GUI), command-line, prompt, etc.) for obtaining or providing information, where the interface may include any information arranged in any fashion. The interface screens may include any number of any types of input or actuation mechanisms (e.g., buttons, icons, fields, boxes, links, drop-down menus or lists, etc.) disposed at any locations to enter/display information, select any quantity of desired entities (e.g., tasks, properties, etc.) and initiate desired actions via any suitable input devices (e.g., mouse, keyboard, etc.). The interface screens may include any suitable actuators (e.g., links, tabs, buttons, etc.) to navigate between the screens in any fashion. The fields of the interface screens may be of any quantity, type, or format (e.g., string, numeric, Boolean, etc.), and may include any desired information with any desired values. The configuration tool may dynamically determine values for the drop-down lists of the various interface screens based on known or ascertained information or information entered by a user. The report may include any information arranged in any fashion, and may be configurable based on rules or other criteria to provide desired information to a user.

Any quantity of any types of profiles (e.g., component specific, configuration profile, etc.) may be imported into a configuration profile. The tasks and profile environments of source profiles may be mapped to any quantity of entities within the target configuration profile. The mappings may be indicated in any desired fashion, and may be selected by a user or predetermined for importation. A new task may be created within the target configuration profile based on any desired conditions, and may be placed in the target configuration profile at any desired position within the order of task execution. A profile environment may similarly be created within the target configuration profile based on any desired conditions.

Any quantity of properties or property values from the source profiles may be assigned to mapped entities within the target configuration profile. The property values assigned to the target configuration profile from the source profile may be modified in any desired fashion (e.g., assign a certain percentage or portion of a property value, apply a mathematical or other operation to the property value, etc.). The property value assignment may be conditional and based on any desired criteria (e.g., a quota, thresholds for the property values, etc.). Entities within the source and target configuration profiles may be matched based on any desired criteria (e.g., symbolic names, associated properties, etc.). Further, validity of mappings between source and target configuration profiles may be based on any desired criteria (e.g., associated properties, mappings, etc.).

The configuration tool of present invention embodiments is not limited to the specific tasks described above, but may be utilized to merge or consolidate any quantity of any types of profiles for any quantity of system components to configure any type of system having any quantity of any types of various system components.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of importing information from a source profile for configuring one or more system components into a target profile for configuring a system including a plurality of system components comprising:

mapping a plurality of tasks within the source profile to a plurality of tasks of the target profile pertaining to configuring a system including a plurality of system components, wherein the plurality of tasks are arranged in the target profile in an order of execution and each task includes a configuration activity to configure the system, and wherein the target profile supports plural instances of at least one task;

comparing properties of the plurality of tasks within the source profile to properties of corresponding mapped tasks in the target profile;

setting the values of the properties of the plurality of tasks in the target profile to the property values of the corresponding mapped tasks of the source profile in response to the comparison indicating the properties correspond, wherein setting the values further comprises:

determining the presence within the target profile of a plural instance task with non-default values mapped to a task present in the source profile and creating an additional instance of the task in the target profile with property values of the mapped task in the source profile; and executing the plurality of tasks of the target profile with the set values of the properties in the order of execution to perform the configuration activities and configure the system.

2. The computer-implemented method of claim 1, wherein the source profile includes a profile for configuring a specific system component.

3. The computer-implemented method of claim 1, wherein the source profile includes a configuration profile for configuring a system with a plurality of different components.

4. The computer-implemented method of claim 1, wherein mapping includes:

excluding portions of the source profile from mapping to the target profile.

5. The computer-implemented method of claim 1, wherein the source profile indicates an environment.

6. The computer-implemented method of claim 1, further including:

determining the presence within the target profile of a task mapped to a task present in the source profile and creating the task in the target profile in response to the absence of that task.

7. The computer-implemented method of claim 1, wherein the system includes a software system, and the system components include software components of the software system.

8. A computer system for importing information from a source profile for configuring one or more system components into a target profile for configuring a system including a plurality of system components comprising:

at least one processor configured to:

map a plurality of tasks within the source profile to a plurality of tasks of the target profile pertaining to configuring a system including a plurality of system components, wherein the plurality of tasks are arranged in the target profile in an order of execution and each task includes a configuration activity to configure the system, and wherein the target profile supports plural instances of at least one task;

compare properties of the plurality of tasks within the source profile to properties of corresponding mapped tasks in the target profile;

set the values of the properties of the plurality of tasks in the target profile to the property values of the corresponding mapped tasks of the source profile in response to the comparison indicating the properties correspond, wherein setting the values further comprises:

determining the presence within the target profile of a plural instance task with non-default values mapped to a task present in the source profile and creating an additional instance of the task in the target profile with property values of the mapped task in the source profile; and execute the plurality of tasks of the target profile with the set of values of the properties in the order of execution to perform the configuration activities and configure the system.

9. The computer system of claim 8, wherein the source profile includes a profile for configuring a specific system component.

10. The computer system of claim 8, wherein the source profile includes a configuration profile for configuring a system with a plurality of different components.

11. The computer system of claim 8, wherein mapping includes:

excluding portions of the source profile from mapping to the target profile.

12. The computer system of claim 8, wherein the source profile indicates an environment.

13. The computer system of claim 8, wherein the at least one processor is further configured to:

determine the presence within the target profile of a task mapped to a task present in the source profile and create the task in the target profile in response to the absence of that task.

14. The computer system of claim 8, wherein the system includes a software system, and the system components include software components of the software system.

15. A computer program product for importing information from a source profile for configuring one or more system components into a target profile for configuring a system including a plurality of system components comprising:

a non-transitory computer readable storage medium having computer readable program code embodied therewith, the computer readable program code comprising computer readable program code configured to:

map a plurality of tasks within the source profile to a plurality of tasks of the target profile pertaining to configuring a system including a plurality of system components, wherein the plurality of tasks are arranged in the target profile in an order of execution and each task includes a configuration activity to configure the system, and wherein the target profile supports plural instances of at least one task;

compare properties of the plurality of tasks within the source profile to properties of corresponding mapped tasks in the target profile;

set the values of the properties of the plurality of tasks in the target profile to the property values of the corresponding mapped tasks of the source profile in response to the comparison indicating the properties correspond, wherein setting the values further comprises:

determining the presence within the target profile of a plural instance task with non-default values mapped to a task present in the source profile and creating an additional instance of the task in the target profile with property values of the mapped task in the source profile; and execute the plurality of tasks of the target profile with the set values of the properties in the order of execution to perform the configuration activities and configure the system.

16. The computer program product of claim 15, wherein the source profile includes a profile for configuring a specific system component.

17. The computer program product of claim 15, wherein the source profile includes a configuration profile for configuring a system with a plurality of different components.

18. The computer program product of claim 15, wherein mapping includes:

excluding portions of the source profile from mapping to the target profile.

19. The computer program product of claim 15, wherein the source profile indicates an environment.

20. The computer program product of claim 15, wherein the computer readable program code further comprises computer readable program code configured to:

determine the presence within the target profile of a task mapped to a task present in the source profile and create the task in the target profile in response to the absence of that task.

21. The computer program product of claim 15, wherein the system includes a software system, and the system components include software components of the software system.

* * * * *